Figure 1:
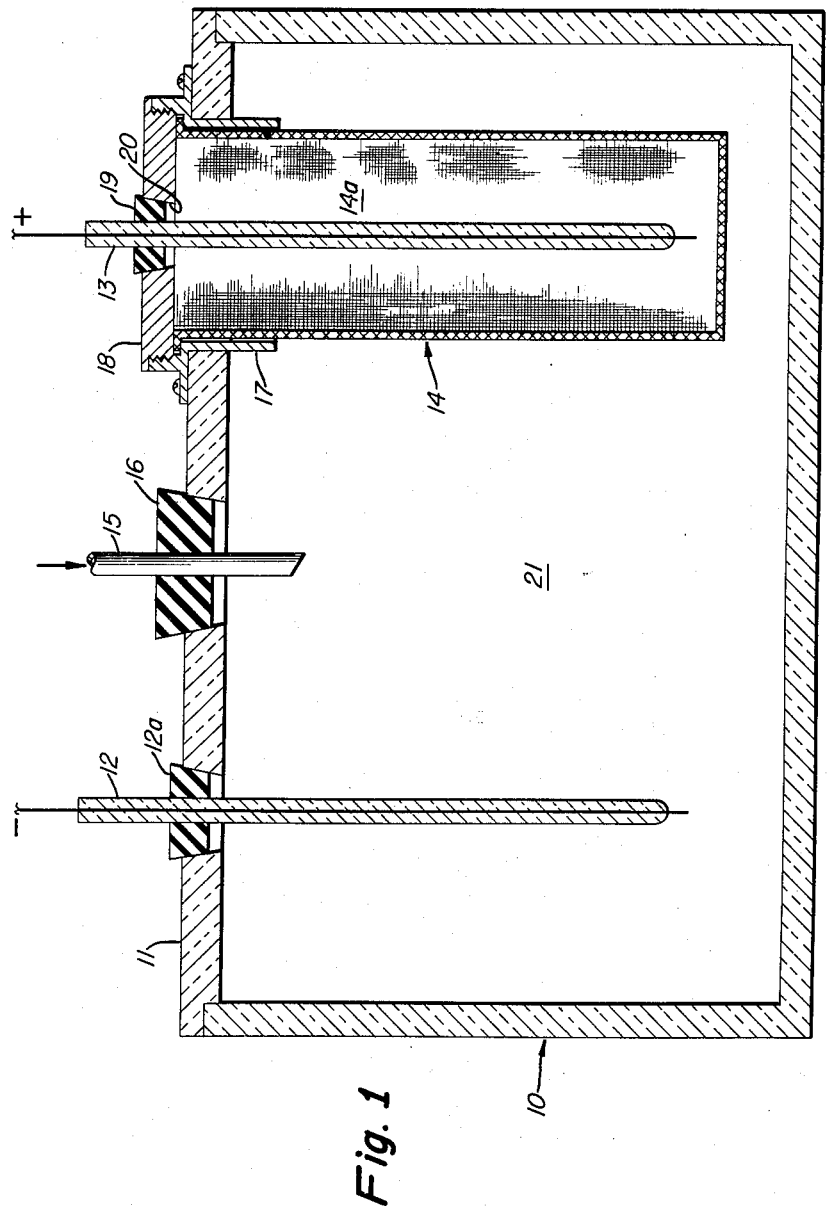

Sept. 27, 1960  J. F. GRUTSCH  2,954,336
UNIVERSAL TITRATING AGENT GENERATOR
Filed July 30, 1957  2 Sheets-Sheet 1

INVENTOR.
James F. Grutsch
BY
ATTORNEY

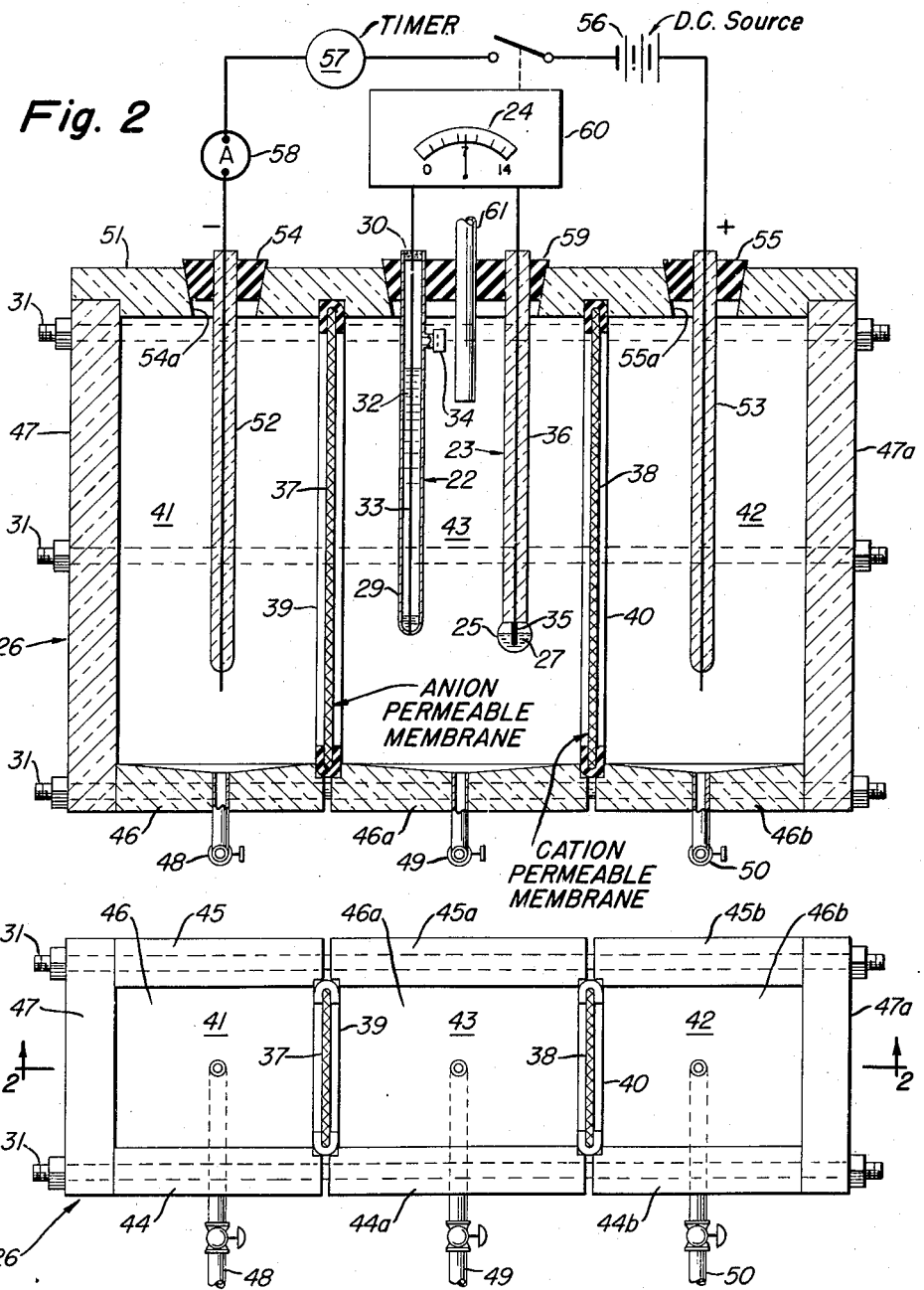

United States Patent Office
2,954,336
Patented Sept. 27, 1960

2,954,336

UNIVERSAL TITRATING AGENT GENERATOR

James F. Grutsch, Hammond, Ind., assignor to Standard Oil Company, Chicago, Ill., a corporation of Indiana Filed July 30, 1957, Ser. No. 675,198

8 Claims. (Cl. 204—195)

This invention relates to method and apparatus for automatic titration. More particularly, the invention pertains to improved method and apparatus for the generation of titrating agents for use in such titrations.

In many processes it is important to measure quantitatively the porportion of known contaminants. For example, the efficient operations of petroleum refinery units requires a constant check on the mercaptan sulfur content of the product. In other operations it is desired to measure the unsaturation of hydrocarbons in such products. In others, it is desired to determine the metals content of both crude and product streams.

Most methods of determining such contaminants or components have heretofore been based upon a titration with volumes of an aqueous or similar titrating solution. The measurement of the unknown has been accomplished for volumetric analysis by addition to the test solution of a reagent of known concentration and in known quantity sufficient to produce a stoichiometric reaction with the contaminant. This is usually referred to as bringing the test volume to an "end point." Knowing the concentration and the volume of the added reagent, the concentration of the contaminant in unknown quantity could be ascertained. Such a system has required the preparation, standardization, storage, controlled introduction and precise measurement of volumetric reagent.

The prepararation of reliable standard solutions involves the expenditure of considerable effort and frequently the operator must employ indirect and time-consuming techniques. Furthermore, the changes in such solutions which often take place with the passage of time would change the characteristics of the reagent. Likewise, the difficulty in making precise measurement of the solution and failure to control the addition of the reagent would introduce errors. These and other disadvantages tend to make the volumetric systems unreliable and not adaptable for routine laboratory analysis or plant control.

Electric methods have been devised for determining the titration end point but many of such have required adding volumetric titration solutions. Accordingly, such methods have required careful manipulation and interpretation of results by a highly skilled operator and have not been adaptable for the determination of unusually low concentrations of contaminants or components of a product stream.

Some systems have also been proposed wherein the titrating agent is coulometrically generated. However, the range of titrating agents which can be so generated is limited by a number of side and direct reactions with either a by-product of the titrating agent generated, or with components of the test solution. In either case, this is frequently undesirable and it is with respect to these problems that this invention is directed.

It is therefore a principal object of my invention to provide a system for producing and introducing the titrating reagent in a manner which is controllable and reproducible. It is a further object of the invention to provide such a system which avoids the difficulties and shortcomings of titration systems heretofore produced. Another object of my invention is to provide a method and means of titrating which eliminates many of the operations which inherently introduce errors in prior systems.

A further object of the invention is to provide a cell arrangement which will permit the coulometric generation of any element in the periodic table which element itself forms, or is a constituent part of, a cationic or anionic material in solution. In addition, it is an object of this invention to provide a system for coulometrically generating both negative and positively charged complex ions and charged organic radicals. These and other objects of the invention will become apparent as the description of the invention proceeds.

Briefly, I attain the objects of my invention by providing a combination titration and titrating ion generation system employing a vessel comprising at least two compartments separated by a permselective membrane which is essentially an ion exchange membrane. Thus a barrier isolates a portion of the vessel into a titrating ion generation chamber and a titration chamber, the barrier comprising a fluid-permeable ion exchange membrane. Two such membranes may be used, one being anion permeable and the other cation permeable. These comprise ion exchange resins cast in sheet or envelope form and are available commercially. An important property of such permselective membranes is their permeability to ions of one charge and impermeability to ions of opposite charge. Therefore, electrical current is carried through the membrane barrier by ions of one charge only (these ions are the titrating ions), whereas both positive and negative charged ions carry current in solutions. The end point of the titration is detected by a pair of electrodes forming part of an electrical circuit means which is responsive to the flow of current between the pair of electrodes only in the presence of a preselected concentration or excess of the titrating ion.

The inventive system relies on an application of Faraday's law. When a direct current is passed through an electrolyte containing positive ions (cations) and negative ions (anions), current is conducted through the cell by movement of the positive ions to the cathode and by movement of the negative ions to the anode. In most instances, the positive and the negative ions are not equally mobile, but one will be transported across the cell more rapidly than the other. The fraction of the current carried by a given ionic species in solution is commonly termed "transport number" or "transference number" of that ionic species. If one (or both) of the electrodes is isolated from the balance of a titration cell or chamber by surrounding it with a membrane which is permeable only to one ionic specie, that specie will carry an extremely high percentage of the current flowing through the cell, while correspondingly the other specie will carry little. Ideally, electrical current would be carried through the membrane by ions of one charge only, although in practice this is rarely if ever attained, and an empirical correction factor is applied, as set forth in detail hereinafter. Inasmuch as the quantity of that ion which is transported across the membrane is covered by Faraday's law, this quantity may be computed by conventional electro chemical computations, applying the empirical correction factor.

The inventive system employs this selective transport of one ion across a selective barrier as a means for producing that ion as a titrant ion to react with a quantitatively unknown substance in the electrolytic cell. Thus, by transporting a determinable quantity of titrant ion across a selective membrane, a conventional coulometric titration may be accomplished while, at the same time, avoiding all of the disabilities and disadvantages which may occur when an electrode reaction, rather than ionic transport, is employed for electrometric titration.

Further details and advantages of the invention will be described by reference to the accompanying drawings wherein:

Figure 1 is a vertical section of a cell containing a chamber isolated by means of a permselective membrane; and Figures 2 and 3 are vertical section and plan views, respectively, of a combination titrating ion generator and titration cell employing a pair of spaced permselective barriers.

Referring to Figure 1, the vessel 10 is provided with a removable top wall 11 through which the platinum generating electrodes 12 and 13 project, the anode 13 being inserted within a cylindrical envelope 14 of a permselective membrane which isolates it from the rest of the vessel 10 containing the cathode 12 supported by plug 12a in cover 11. A titration electrolyte in vessel 10 is a salt neutral to the titration being performed and a salt of the ion to be generated is placed in the anodic compartment 14a. The material being analyzed is added to the vessel 10 by means of conduit 15 passing through the cover 11 and supported by the grommet 16.

The permselective membrane 14 may be supported by collar 17 carried by cover 11 and into which cap 18 is threaded to secure the upper end of the sleeve 14. The anode 13 is in turn supported by grommet or plug 19 removably disposed in the port 20 of cap 18.

When a source of direct current is connected to the electrodes 12 and 13, the titrating ion will pass through the permselective membrane 14 into the titration zone 21 and react with the material being analyzed.

Both anionic and cationic membranes are available commercially with a thickness of about 1/16 inch. The thickness of the membrane 14 is not critical aside from fulfilling the structural strength requirements and avoiding unnecessary bulkiness of the cell. Multiple layers of membranes may be used to provide the desired thickness and permeable supports for the membranes may be provided. Such supports may take the from of frames, or may comprise perforated plastic sheets, screens, and the like.

If a sulphate is to be titrated with barium, barium chloride may be introduced into the anode compartment 14a and sodium sulphate into the titration zone 21 via conduit 15. Upon the application of direct current to the electrodes 12 and 13, the barium ions pass through the membrane 14 and the chloride ions are retained in the anode compartment 14a. The barium and sulphate ions react in the titration compartment and the sulphate ions are excluded from the anode compartment 14a because they are negatively charged ions and cannot pass through the permselective membrane 14.

A detecting system such as illustrated in Figures 2 and 3 may be used with the apparatus of Figure 1 and may comprise a standard reference calomel electrode 22 and a conventional glass-enclosed silver-silver chloride electrode 23. Each of these is conveniently about 3 inches long and may be connected into a conventional pH meter 24. The pH meter 24 comprises basically a potentiometer-type circuit including a volt meter, the scale of which reads directly in terms of pH. The unknown in the titration compartment 43 of the cell 26 is titrated by the coulometrically generated acid from generation compartment 42 and introduced into titration compartment 43 through the cation permeable membrane 38 until the desired pH end point, normally approximating seven, is attained.

The conventional calomel reference electrode 22 includes a glass envelope 29 provided with an insulating stopper 30 through which an electrode 33 depends into a saturated KCl solution 32. Electrical contact with the soution 32 in the calomel or reference cell 22 is through the minute metal fibre electrode 33 which extends through the wall of the glass envelope 29. The KCl solution 32 is maintained saturated by introducing excess crystals into the envelope 29 by way of sidewall port 34.

The conventional glass indicator electrode 23 may comprise a glass sleeve 36 in which the silver-silver chloride electrode 35 is embedded, a short length thereof dipping into the liquid buffer 27 which is enclosed by a glass bulb 25 attached to the lower end of the glass sleeve 36. Such detecting electrode pairs 22 and 23 are well known in the art and further description is not necessary.

Generation of a negatively charged ion, e.g. chloride from barium chloride is the same except that the membrane 14 is anion permeable instead of cation permeable as in the example just described.

This system is particularly adapted for titrating hydrogen ion or hydroxyl ion for automatic pH titrations. In the case of hydrogen ion, the titration electrolyte comprises a metal ion, such as copper which is preferentially discharged at the cathode 12. Similar electrochemical consideration is given to the hydroxyl ion generation and an intermediate number of other ions. Exact amounts of certain materials, such as sulfides, ammonium ion, phenol, etc., as well as complex ions, like $PO_4\equiv$, $SO_4=$, $SCN^-$, etc. can be generated using this cell.

Referring to Figures 2 and 3, the vessel 26 is provided with a pair of spaced planar ion exchange membranes 37 and 38 supported in frames 39 and 40. The two membranes 37 and 38 partition the vessel 26 into a first end chamber 41, a second end chamber 42, and an intermediate chamber 43. The first and second end chambers 41 and 42 comprise ion generating cells and the intermediate chamber 43 comprises the titration cell.

The vessel 26 comprises a plurality of side and end walls 44, 44a, 44b, 45, 45a, 45b, 46, 46a, 46b, and 47, 47a which are clamped in place by tie rods 31. The frames 39 and 40 supporting the membranes 37 and 38 are subjected to sufficient deforming pressure by the adjacent wall portions 44—44a, 44a—44b and 45—45a, 45a—45b to effect a liquid-tight seal. The bottom of each chamber 41, 42, and 43 slopes downwardly to individual valved drains 48, 49, and 50 for withdrawal of fluids as the introduction of fluid test samples and the titrations are conducted.

A cover or lid 51 is disposed across the top of the vessel 26 and serves to support a number of components. The generating electrodes 52 and 53 are supported by grommets 54 and 55 which are, in turn, set within the ports 54a and 55a and the electrodes 52 and 53 are connected in the electrical circuit which includes the power source 56, the timer 57, the ammeter 58, and the related wiring.

The application of current across the cathode 52 and the anode 53 following the introduction into generation cell 41 or 42 of the appropriate substance for liberating the desired ion results in the flow of the selected ion through the associated barrier 37 or 38 into the titration cell 43. The transported ion there reacts with the material being analyzed and, accordingly, reduces the concentration of the generated ion. This reaction continues until the end point is reached whereupon an excess of generated ion appears within titration cell 43.

This excess titration ion may be detected by a pair of detector electrodes 22 and 23 which are supported by plug 59 in the top wall 51 of the vessel 26. A conduit 61 passing through the plug 59 permits the introduction of the material to be analyzed. It is also contemplated that electrolyte solution can be withdrawn continuously or cyclically by way of the valved drain 49, thereby making the titration essentially continuous. In such event, the flow of current necessary to maintain the supply of titration ion constant is a measure of the average titration end point of the material being analyzed.

The detector electrodes 22 and 23 are connected to a meter circuit 60 which indicates the presence of the excess of the generated ion when the end point of the material being analyzed has been reached. If desired, this indicator circuit 60 may also be used to terminate the generation of the ion after the end point has been reached by activating suitable relays, etc.

The apparatus described and illustrated in the drawings may be used in conducting pH titrations wherein acid is generated for titration of caustic samples. In the generation cells, the electrodes 52 and 53 are connected to the D.C. source 56 with the milliammeter 58 and timer 57 in the circuit to determine the number of coulombs passed through the cell. The vessel is filled with water and acid added to compartments 41 and 42 and the caustic solution added via conduit 61 to titration cell 43. When the current is turned on, the cations migrate toward the cathode 52 and the anions toward the anode 53. However, the permselective membranes 37 and 38 allow only either anions or cations to pass into the titration cell 43.

For pH titrations, either hydronium (H+) or hydroxide (OH−) ions are generated depending on whether the unknown sample is basic or acidic. In generation cell 41 the reaction at the electrode 52 is reduction of hydrogen ion to hydrogen gas ($2H^+ + 2e^- \rightarrow H_2$); whereas in generation cell 42 the reaction at the electrode 53 is the oxidation of hydroxyl ions to oxygen gas, the hydroxyl ions being obtained from the water used as solvent ($4OH^- - 4e^- \rightarrow 2H_2O + O_2$). For example, in the generation of hydronium ion for titrating a basic sample, the closing of the coulometric circuit causes current to flow with the result that hydronium ions in compartment 42 are repelled from the anode 53, pass through the cation permeable membrane 38 and react with the basic constituent in the sample in the titration compartment 43. Simultaneously, the sulfate ($SO_4^=$) ions added to compartment 41 as electrolyte are repelled from the cathode 53, pass through the anion permeable membrane 37 into compartment 43. In the titration cell 43 it is seen that the net reaction has produced an acidic sulfuric acid-salt solution from a neutral salt solution. It is this production of acid in the generator cell 43 that makes this cell useful for pH titrations.

To conduct a titration of caustic, the following procedure is employed:

(1) Compartments 41 and 42 are filled with 0.01 M $H_2SO_4$ in order to (a) provide hydronium (H+) ions and (b) suppress the hydroxide ions that would otherwise be present and pass through the anion permeable membrane 37 and contaminate the titration. Compartment 43 is filled with 0.01 M $Na_2SO_4$ to provide electrical conduction;

(2) The calomel-glass electrode combination 22 and 23 in compartment 43 together with the pH meter measures changes in pH;

(3) Current which generates sulfuric acid in compartment 43 containing electrodes 22 and 23 is turned on and acid is generated until an arbitrary refernce point, say pH of 3, is reached after which the current is turned off;

(4) Caustic sample to be titrated is added to compartment 43;

(5) Timer 57 is reset and sample is titrated back to reference pH; and (6) Basicity of sample is determined from an empirical calibration curve, which reflects the fact that the membranes are not 100% non-selective for the ions which should be retained. For example, some of the hydroxyl ions whose presence cannot be suppressed completely in generation compartment 41, pass readily into compartment 43.

The generation of bases is accomplished in a fashion analogous to that described for acid, the difference being that compartments 41 and 42 are made 0.01 M NaOH. In this case the ions migrate when current is passed through the cell 26 and products are formed by ionic transfer through the membranes 37 and 38 with caustic being generated in the intermediate compartment or cell.

When the test solution is added to compartment 43 of the coulometric cell, the applied potential makes the ions with a positive charge migrate toward the cathode 52 but they are held in compartment 43 by a membrane 37 permeable only to anions. Similarly, the negatively charged ions tend to migrate to the anode 53 but are restrained from doing so by the other membrane 38 permeable only to cations. Therefore, the net effect is that theoretically no ionic material leaves compartment 43. Therefore, the aforementioned interferences found in the conventional coulometric pH titrations are completely avoided by not allowing the titration solvent to contact the coulometric electrodes.

The titration procedure for pH titrations of acid are the same as set forth for the above except that sodium hydroxide is substituted for sulfuric acid in the end compartments 41 and 42 and the arbitrary reference end point in step (3) is pH 9.

As an example of anionic titrations, I may generate sulfides for the titration of insoluble sulfides. Sodium sulfide is added to compartment 41, and sodium chloride to compartments 42 and 43. When the current is turned on, the ions will tend to migrate with the production of sodium sulfide titrating reagent in compartment 43.

The list of cations titratable with sulfides is very large as anyone skilled in the art of qualitative analysis is aware.

The sulfide generation described is susceptible to interference by dissolved oxygen because of the ease with which sulfide ions are oxidized. Therefore, the anode 53 is shielded with a glass tube so that all the oxygen produced is vented. A layer of oil on the surface of the electrolyte stops the solution of atmospheric oxygen. This titration of sulfide ion is typical for anionic titrations. The end point is easily and very sensitively determined potentiometrically with a glass-sulfided silver detector electrode combination.

Cationic titrations can be illustrated by the titration of fluoride with thorium on the apparatus of Figures 2 and 3. Sodium nitrate is added to compartment 41, compartment 43 is made 0.02 M with a sodium chloroacetate; and thorium nitrate is added to compartment 42. The electrical production of thorium nitrate occurs in compartment 43 and this is used for the titration of fluoride ions. The end point can be detected colorimetrically by adding sodium alizarin sulfonate to compartment 43.

By my system complex cations like zirconyl ($ZrO^{++}$) and vanadyl ($VO^{++}$) can be generated whereas they are improbable conventionally. Also organic cationic material like amines can be generated whereas they are improbable by any other coulometric technique. Furthermore, very reactive cations like lithium, sodium, potassium, and barium, are easily generated with the described cell whereas they cannot by conventional systems.

From the description given herein it will be apparent that I have attained the objects of the invention and have provided a method and means for the coulometric generation of titrating ions which are controllable and reproducible while avoiding the difficulties and shortcomings of titration systems heretofore provided. Although detailed description of preferred embodiments has been given, this is intended for the purpose of illustration only and accordingly, it is contemplated that changes and modifications can be made in the described system and in the mode of using such system without departing from the scope of the invention.

What I claim is:

1. A system for electrically producing titrating ions and for effecting the titration of an unknown sample, the improvement which comprises titration cell means, titrating ion cell means, a common wall between said cell means, said wall comprising an ion exchange membrane, said membrane being permeable to the titrating ions, an electrolyte solution in said cell means, means for introducing a test sample into said titration cell, means for supplying a titrating ion-producing solution in said generation cell, electrode means in each of said cells adapted to cause the migration of titrating ion from said titrating cell into said titration cell through said wall, and a second pair of electrodes in said titration cell adapted to detect the presence of an excess of titrating ions therein, the presence of said excess ions being an indication of the end point of the titration.

2. A system for electrically producing titrating ions and for effecting the titration of an unknown sample with such ions, the improvement which comprises a vessel, an ion exchange membrane dividing said vessel into a titration cell and a titrating ion producing cell, an electrolyte in said vessel, means for introducing a test sample into said titration cell, means for supplying a titrating ion-producing substance into said producing cell, electrode means in said cells adapted to cause the migration of such titrating ion from said producing cell through said membrane into said titration cell, and a second pair of electrodes in said titration cell adapted to detect the presence of a pre-selected excess of titrating ion therein.

3. A universal titrating agent titration cell which comprises in combination a first vessel adapted to confine a quantity of an electrolyte, a first ion exchange membrane partition in said vessel, a second ion exchange membrane partition in said vessel, said partitions together providing a first end compartment, an intermediate compartment, and a second end compartment, a first electrode in said first end compartment, a second electrode in said second end compartment, electric circuit means including said first and second electrodes, a pair of spaced detector electrodes disposed within said intermediate compartment, and electric circuit means including said pair of detector electrodes for detecting the presence of unreacted titrant ion in said intermediate compartment.

4. A universal titrating agent titration cell which comprises in combination a first vessel adapted to confine a quantity of an electrolyte, an anion permeable membrane forming a partition across said vessel, a cation permeable membrane forming a second partition across said vessel, said membranes together providing within said vessel a first generation compartment, an intermediate titrating compartment, and a second generation compartment, a first electrode in said first compartment, a second electrode in said second compartment, said first and second electrodes being adapted to coulometrically generate titrating ion in one of said first and second compartments, electric circuit means including timer, current source, and current-responsive means including said first and second electrodes, a second pair of spaced detector electrodes disposed within said intermediate compartment, and electric circuit means including said second pair of electrodes for detecting the presence of unreacted titrant ion in said intermediate compartment, and means responsive to such presence of unreacted titrant ion adapted to terminate the coulometric transportation of titrating ion.

5. An apparatus for titrating with electrically transported titrant ions which comprises in combination titration and ion generation cell means, said cell means comprising a vessel, a barrier isolating a portion of said vessel into a titrant ion generation chamber and another portion of said vessel into a titration chamber, said barrier comprising a fluid-permeable ion exchange membrane, a first electrode means on one side of said barrier in said ion generation chamber, a second electrode means on the other side of said barrier exterior of said generation chamber, electrical circuit means including said first and second electrodes, a pair of detector electrodes disposed within said titration chamber, means for introducing a sample to be titrated into said titration chamber, and electrical circuit means including said pair of detector electrodes.

6. An apparatus for titrating which comprises in combination titrating ion generation cell means, a vessel, a barrier dividing said vessel into a titrating ion generation chamber and a titration chamber, said barrier comprising a fluid-permeable ion exchange membrane, first electrode means in said vessel, ion detector electrode means disposed within said titration chamber, means for introducing a sample to be titrated into said titration chamber, and electrical circuit means including said electrodes.

7. In a titration system, a vessel, a pair of spaced barrier partition means in said vessel comprising ionic perm selective fluid and ion permeable barriers dividing said vessel into three compartments, one of said partitions being cationic permeable and the other of said partitions being anionic permeable, a quantity of electrolyte in said vessel, a pair of detector electrodes in said electrolyte between said partitions, and electrical circuit means including said detector electrodes responsive to the presence of a selected titration ion.

8. A titrating apparatus comprising a titration cell, a plurality of electrode means in said titration cell for coulometrically transporting titrating ions through said cell, at least one barrier selectively permeable to titrating ions, said barrier isolating at least one of said electrode means from said titration cell, and electrode means in said titration cell responsive to the presence of titrating ions in said cell whereby the end point of a reaction including said titrating ions may be sensed.

References Cited in the file of this patent

UNITED STATES PATENTS

| | | |
|---|---|---|
| 1,972,561 | Heubaum | Sept. 4, 1934 |
| 2,278,248 | Darrah | Mar. 31, 1942 |
| 2,614,976 | Patnode et al. | Oct. 21, 1952 |
| 2,636,851 | Juda et al. | Apr. 28, 1953 |
| 2,723,229 | Bodamer | Nov. 8, 1955 |
| 2,744,061 | De Ford et al. | May 1, 1956 |
| 2,758,079 | Eckfeldt | Aug. 7, 1956 |
| 2,835,633 | Kollsman | May 20, 1958 |